United States Patent [19]

Needham et al.

[11] Patent Number: 5,517,507
[45] Date of Patent: May 14, 1996

[54] NOTIFICATION BY ENERGY BURST OF MESSAGES WITH UNACCEPTABLE QUALITY

[75] Inventors: Michael L. Needham, Palatine; Kenneth J. Crisler, Wheaton; Lawrence J. Marturano, Mt. Prospect; Mark A. Gannon, Sleepy Hollow, all of Ill.

[73] Assignee: Motorola, Inc., Schaumburg, Ill.

[21] Appl. No.: 161,881

[22] Filed: Dec. 3, 1993

[51] Int. Cl.⁶ .................................................. G06F 11/10
[52] U.S. Cl. .............................................. 371/32; 370/95.3
[58] Field of Search ........................ 371/32, 33; 370/94.1, 370/94.2, 95.2, 94.3, 60, 95.3; 340/825.5, 825.54

[56] References Cited

U.S. PATENT DOCUMENTS

| | | | |
|---|---|---|---|
| 4,888,767 | 12/1989 | Furuya et al. | 370/94.1 |
| 4,914,654 | 4/1990 | Matsuda et al. | 370/94.1 |
| 4,951,281 | 4/1990 | Muto et al. | 370/95.2 |
| 5,210,751 | 5/1993 | Onoe et al. | 371/32 |

*Primary Examiner*—Roy N. Envall, Jr.
*Assistant Examiner*—Thomas E. Brown
*Attorney, Agent, or Firm*—Susan L. Lukasik

[57] ABSTRACT

A data message (201) is transmitted (301) to a plurality of communication units (103, 105, 107, and 109). The data message (201) is received (401) by the plurality of communication units, which determine (403) whether the quality of the received data message is acceptable. When at least one of the plurality of communication units determines that the received data message is of unacceptable quality, the at least one of the plurality of communication units transmits (411) an energy burst (203) in a predetermined time window. Upon detection of the energy burst (203), the transmitting device may retransmit (309) the data message to the plurality of communication units.

21 Claims, 3 Drawing Sheets

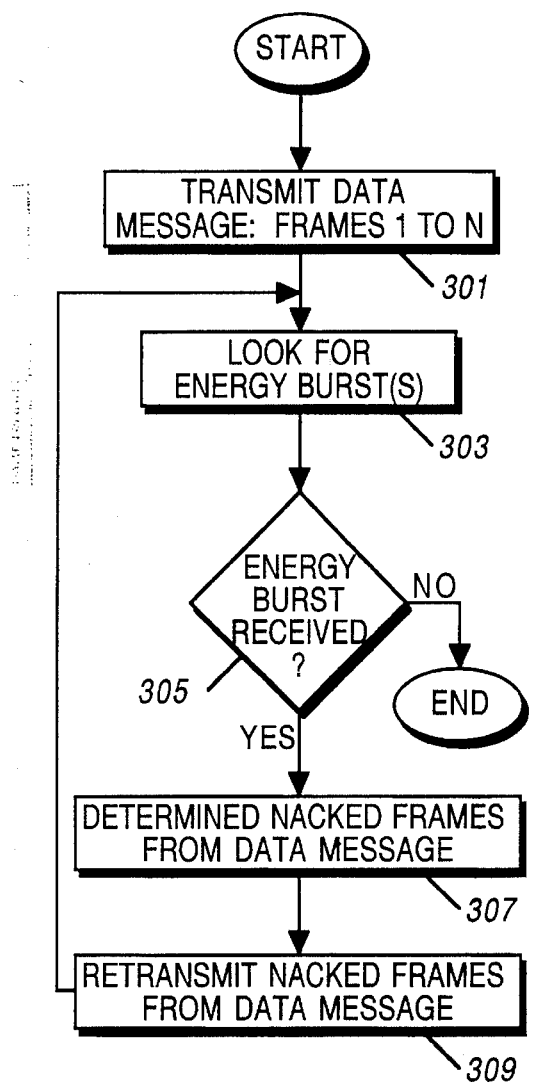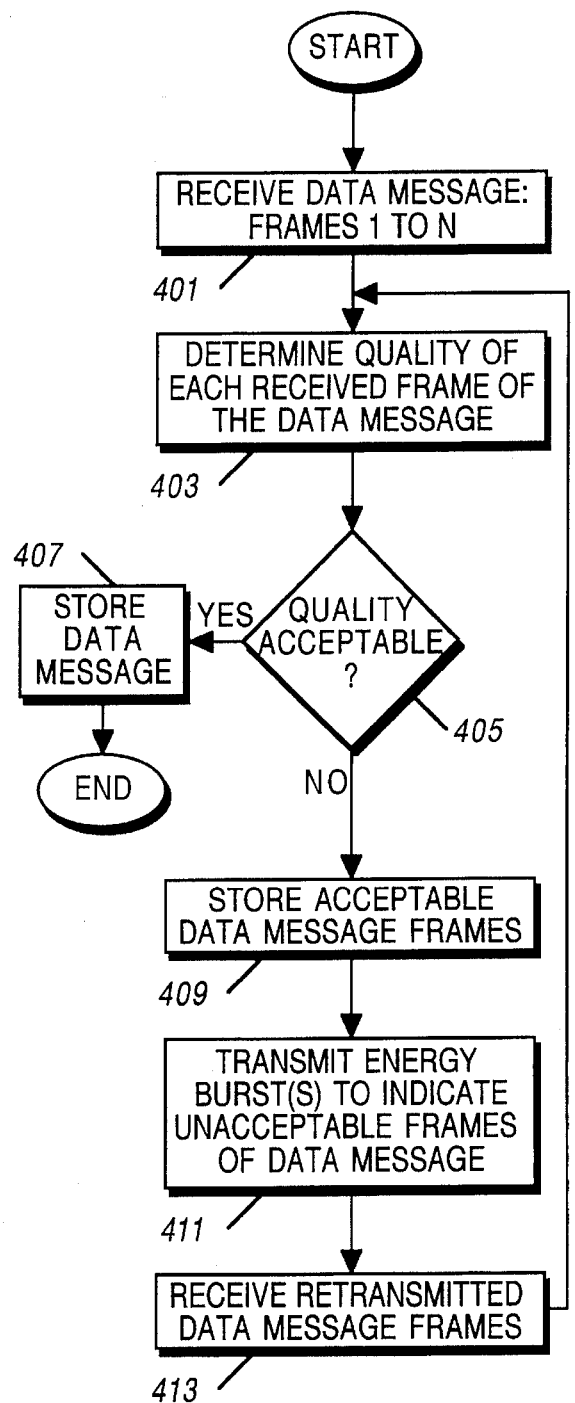

NOTIFICATION BY ENERGY BURST OF MESSAGES WITH UNACCEPTABLE QUALITY

FIELD OF THE INVENTION

This invention relates to data message transmission, including but not limited to notification of successfully or unsuccessfully received messages.

BACKGROUND OF THE INVENTION

A number of techniques for controlling errors in communication transmissions exist. One such technique is an automatic-repeat-request (ARQ) scheme. The receiver attempts to detect errors according to an error-detection mechanism such as an error-detection code. A data message may be divided into a number of frames. If no errors are detected in a frame of data, the receiver assumes that the frame is error-free, accepts the frame, and via a return channel, may inform the transmitter that the frame was successfully received by identifying the frame by number. A notification of successful reception is often referred to as an ACK, or acknowledgment. If errors are detected in the frame of data, the receiver, via the return channel, may inform the transmitter and request retransmission of the frame by number. This request for retransmission is often referred to as a NACK, or negative acknowledgment. This process of transmission, informing, and retransmission continues until an entire message is successfully received.

In a broadcast data system, a single transmission may target numerous receiving communication units, sometimes thousands of units. Because each of the units must send either an ACK or a NACK for each data frame, the return channel becomes inundated with thousands of messages, consuming valuable time on the communication channel. If use of the return channel is not coordinated, many of these messages are likely to coincide at least partially, resulting in corrupted ACKs and NACKs, rendering the transmitter unable to distinguish which messages were received successfully and which ones were not. One method for returning ACKs and NACKs via a return channel in a coordinated manner is to designate a particular time interval for each unit to transmit an ACK/NACK. When there are numerous communication units, such a system is wasteful of the communication channel, and messages will take a very long time to be transmitted.

Accordingly, there is a need for an improved method of returning ACKs and NACKs in a broadcast data system utilizing an ARQ protocol.

BRIEF DESCRIPTION OF THE DRAWINGS

FIG. 2-1 shows timing diagrams and frequency diagrams of the transmission of data messages and energy bursts in the same frequency band in accordance with the invention.

FIG. 2-2 shows timing diagrams and frequency diagrams of the transmission of data messages and energy bursts in different frequency bands in accordance with the invention.

FIG. 3 is a flowchart showing transmitting device activity in accordance with the invention.

FIG. 4 is a flowchart showing receiving device activity in accordance with the invention.

FIG. 5-1 shows timing diagrams and frequency diagrams of the transmission of data messages in flames and transmission of energy bursts in corresponding time windows in accordance with the invention.

FIG. 5-2 shows timing diagrams and frequency diagrams of the transmission of data messages and energy bursts in the same frequency band, and time windows for transmitting energy bursts fall between the transmission of flames of a data message in accordance with the invention.

FIG. 5-3 shows timing diagrams and frequency diagrams of the transmission of data messages, in frames, and energy bursts in different frequency bands in accordance with the invention.

FIG. 5-4 shows timing diagrams and frequency diagrams of the transmission of data messages, in frames, and energy bursts in separate time windows, where the energy bursts are transmitted in multiple frequency bands in accordance with the invention.

DESCRIPTION OF A PREFERRED EMBODIMENT

Figure 1:
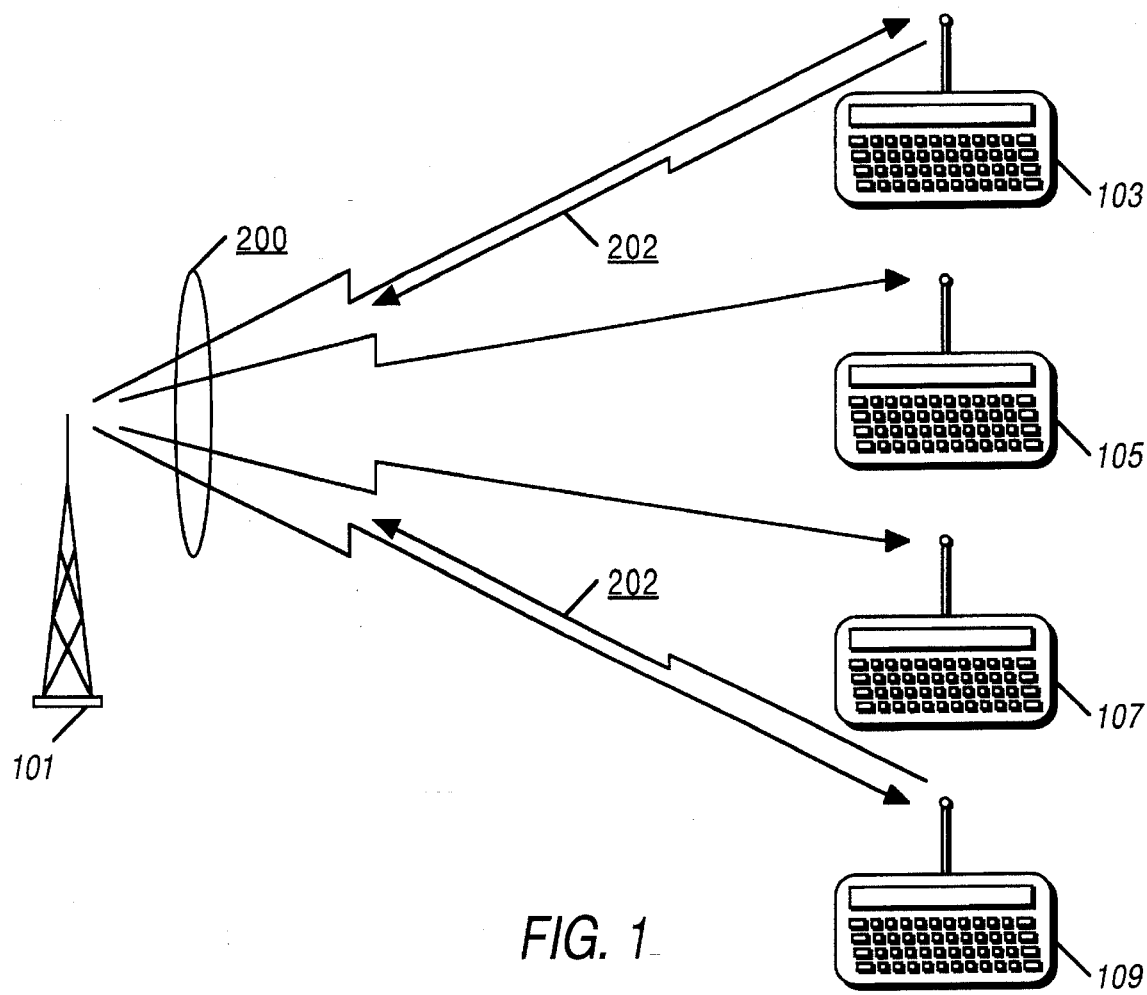
FIG. 1 is a block diagram of a communication system in accordance with the invention.

The following describes an apparatus for and method of informing a transmitter when a data message was successfully/unsuccessfully received by a plurality of receiving communication units. The communication units that receive a data message determine if the message has acceptable quality. If a unit determines that the message has unacceptable quality, the unit transmits an energy burst in a predetermined time window. When the transmitting unit detects this energy burst, it subsequently retransmits the data message.

A data message is transmitted to a plurality of communication units. The data message is received by the plurality of communication units, which determine whether the quality of the received data message is acceptable. When at least one of the plurality of communication units determines that the received data message is of unacceptable quality, at least one of the plurality of communication units transmits an energy burst in a predetermined time window. Upon detection of the energy burst, the transmitting device may retransmit the data message to the plurality of communication units. The predetermined time window may be temporally located immediately subsequent to the receipt of the data message. The energy burst may be a radio frequency energy burst that is transmitted in a predetermined radio frequency band. In addition, the data message may be transmitted in a radio frequency band other than the frequency band in which the energy burst is transmitted, in which instance another message may be transmitted immediately subsequent to the transmission of the data message.

Alternatively, the data message may be comprised of a multiplicity of data frames. The data message is transmitted to a plurality of communication units. The data message is received by the plurality of communication units, which determine whether the quality of each frame of the received data message is acceptable. When at least one of the plurality of communication units determines that at least one frame of the received data message is of unacceptable quality, at least one communication unit transmits an energy burst in a predetermined time window. The predetermined time window may be temporally located immediately subsequent to the receipt of the data message. The data message may be transmitted in a radio frequency band other than the frequency band in which the energy burst is transmitted. A second data message may be transmitted immediately subsequent to the transmission of the data message.

When the data message is comprised of a multiplicity of data frames, the predetermined time window may be comprised of a multiplicity of time segments. Each frame of the data message may correspond to one of the multiplicity of time segments; and when at least one of the plurality of communication units determines that at least one frame of the received data message is of unacceptable quality, at least one of the plurality of communication units transmits an energy burst in at least one of the multiplicity of time segments. After detection of the energy burst, the transmitting device may retransmit at least one frame of the received data message to the plurality of communication units. The energy burst may be a radio frequency energy burst that is transmitted in a predetermined radio frequency band.

When the data message is comprised of a multiplicity of data frames, the predetermined radio frequency band may be comprised of a multiplicity of frequency band divisions, wherein each of the multiplicity of data frames corresponds to one of the multiplicity of frequency band divisions; and when at least one of the plurality of communication units determines that at least one frame of the received data message is of unacceptable quality, at least one of the plurality of communication units transmits an energy burst in at least one of the multiplicity of frequency band divisions corresponding to at least one frame of the received data message.

When the data message is comprised of a multiplicity of data frames, the predetermined time window may be comprised of a multiplicity of time segments and the predetermined radio frequency band may be comprised of a multiplicity of frequency band divisions, wherein each of the multiplicity of data frames corresponds to a time-frequency pair, wherein each time frequency pair corresponds to one of the multiplicity of time segments and one of the multiplicity of frequency band divisions; and when at least one of the plurality of communication units determines that at least one frame of the received data message is of unacceptable quality, at least one of the plurality of communication units transmits an energy burst in at least one of the time-frequency pairs corresponding to at least one frame of the received data message.

A communication system is shown in FIG. 1, including a plurality of communication units 103, 105, 107, and 109 and a base station or repeater 101. The communication units, such as a KDT 840 available from Motorola, Inc., are capable of receiving and transmitting data messages. In such a system, a data message 200 is sent from the base station 101 to the communication units 103, 105, 107, and 109. Data messages 200 may also be sourced by a communication unit, a communications console (not shown), or other such device, and sent directly to the other communication units or indirectly via the repeater 101. However the data message 200 is sourced, the data message 200 is transmitted once in a broadcast manner, i.e., a one-to-many transmission, as is known in the art. Only four communication units are shown for simplicity of the drawing, but the present invention will be equally successful in a system of any number of units. Reference numeral 202 represents all energy bursts as transmitted by communication units that do not receive the data message 200 with acceptable quality. Data messages 200 and energy bursts 202 are described in more detail in FIG. 2-1.

A transmitting device may be a base station 101 or a communication unit 103, 105, 107, and 109. A receiving device may also be a base station 101 or a communication unit 103, 105, 107, and 109.

Figures 1, 2:
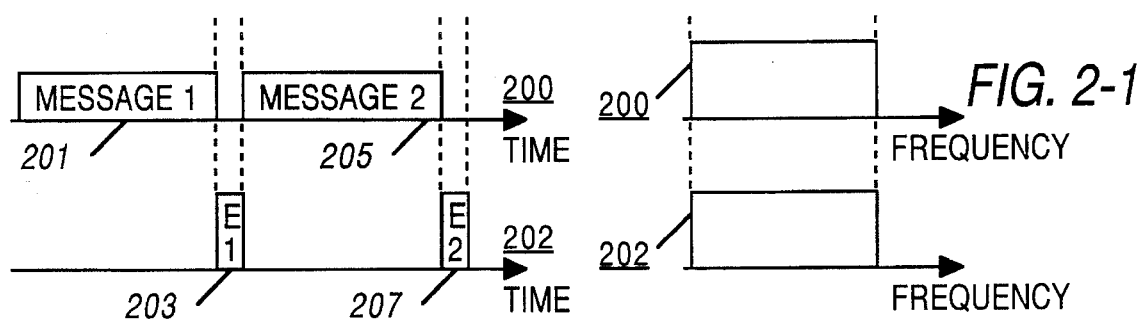
Figure 2:
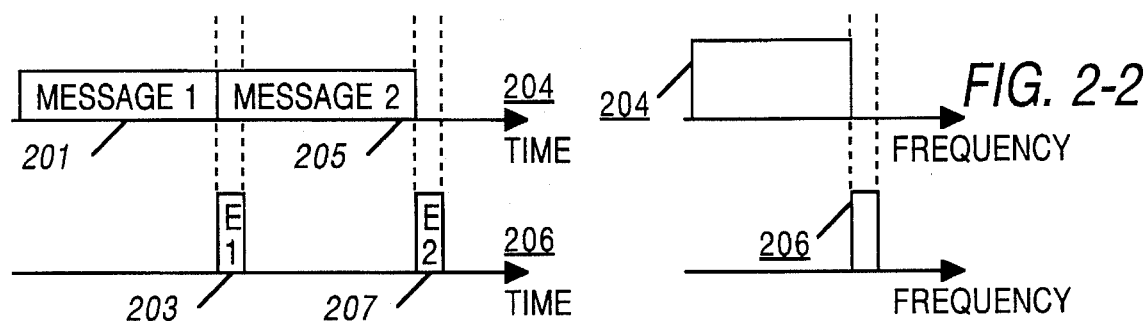

Throughout FIG. 2-1 and FIG. 2-2, the reference numerals 200 or 204 represent any combination of data messages 201 and 205 and the reference numerals 202 or 206 represent any combination of energy bursts 203 and 207.

Timing diagrams and frequency diagrams of the transmission of data messages 200 and energy bursts 202 are shown in FIG. 2-1, where the data messages and energy bursts are transmitted in the same frequency band. Two data messages 201 and 205 and two energy burst windows 203 and 207 are shown. The timing diagrams on the left of FIG. 2-1 show when data messages and energy bursts are transmitted in relation to one another. For example, a first message 201 is transmitted substantially immediately followed by an energy burst 203, which is transmitted by the receiving communication unit if necessary. A second message 205 may immediately be transmitted upon the end of the time window for the first energy burst 203. A window for a second energy burst 207 follows the completion of the second message 205.

In the frequency diagram on the right of FIG. 2-1, a frequency channel is shown in which both the data messages 200 and the energy bursts 202 occupy the same frequency band width, i.e., the same communication channel.

Timing diagrams and frequency diagrams of the transmission of data messages 204 and energy bursts 206 are shown in FIG. 2-2, where the data messages and energy bursts are transmitted in different frequency bands. Two data messages 201 and 205 may be transmitted back-to-back as shown in the timing diagrams at the left of FIG. 2-2, where, the second message 205 immediately follows the first message 201. The energy bursts 206, if necessary, are transmitted in a predetermined time window following the transmission of the each message, preferably in a time window immediately following or slightly delayed beyond the end of the each message. For example, the first energy burst 203 may be transmitted at the beginning of the transmission of the second message 205. The second energy burst 207 may be transmitted some time immediately after the completion of transmission of the second message 205. The frequency diagram at the right of FIG. 2-2 shows a communication channel that is subdivided, such that data messages 204 are transmitted in the larger section of the communication channel and the energy bursts 206 are transmitted in the smaller section of the communication channel. The frequency band allotted for the energy bursts 206 may be at the beginning (not shown) or the end of the channel, as shown, or even in a different channel all together (not shown), as long as the transmitting units know in what frequency band to find the energy bursts. For data messages that are comprised of multiple frames and their associated energy bursts, see FIG. 5-1, FIG. 5-2, FIG. 5-3, and FIG. 5-4.

For example, the base station 101 of FIG. i transmits two data messages 201 and 205 (200) of FIG. 2 to the communication units 103, 105,107, and 109. Two communication units 103 and 109 do not receive the first message 201 with acceptable quality and one communication unit 103 does not receive the second message 205 with acceptable quality. The first communication unit 103 transmits two energy bursts 202, an energy burst 203 in the time slot immediately following the first message 201 and an energy burst 207 in the time slot immediately following the second message 205. The second communication unit 109 transmits one energy burst 203 in the time slot immediately following the first message 201. Consequently, both the first communication unit 103 and the second communication unit 109 transmit energy bursts 203 in the first energy burst time window. Because no particular data is included in an energy burst, these two simultaneous transmissions do not interfere with each other in a destructive way but instead reinforce each other, as the base station 101 is merely looking for energy in the time slot, not particular data. Because there is energy in this slot, it is assumed that the previously transmitted message was not successfully received, and the base station knows it was requested to retransmit the message. If all communication units receive a message with acceptable quality, then no energy bursts are transmitted. The base station 101, because no energy is transmitted in the energy burst time window for that message, assumes that the message was received with acceptable quality by all the communication units and will not retransmit the message.

The energy bursts are substantially the same, and the structure of any individual energy burst conveys no message or specific data in itself. Rather, the information conveyed by an energy burst is contained in its temporal location, which indicates the particular data message that was not received with acceptable quality. Thus, if multiple communication units transmit an energy burst simultaneously, they will generally reinforce the effects of other bursts rather than corrupting other bursts. By forcing the simultaneous transmission of energy bursts that serve to NACK a particular data message in accordance with the present invention, a considerable increase in channel efficiency is realized over the prior art.

Figures 1, 5:
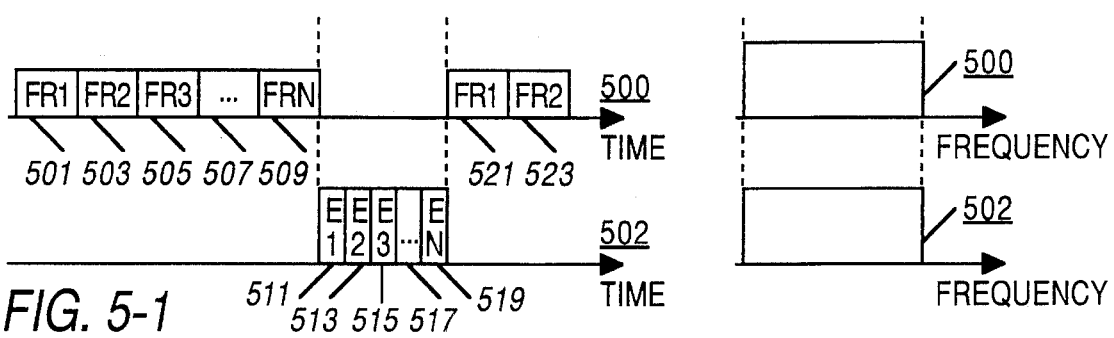
Figures 2, 5:
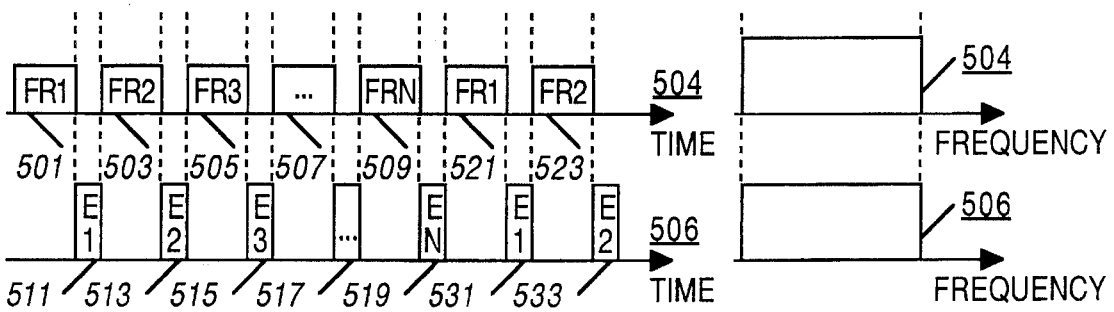
Figures 3, 5:
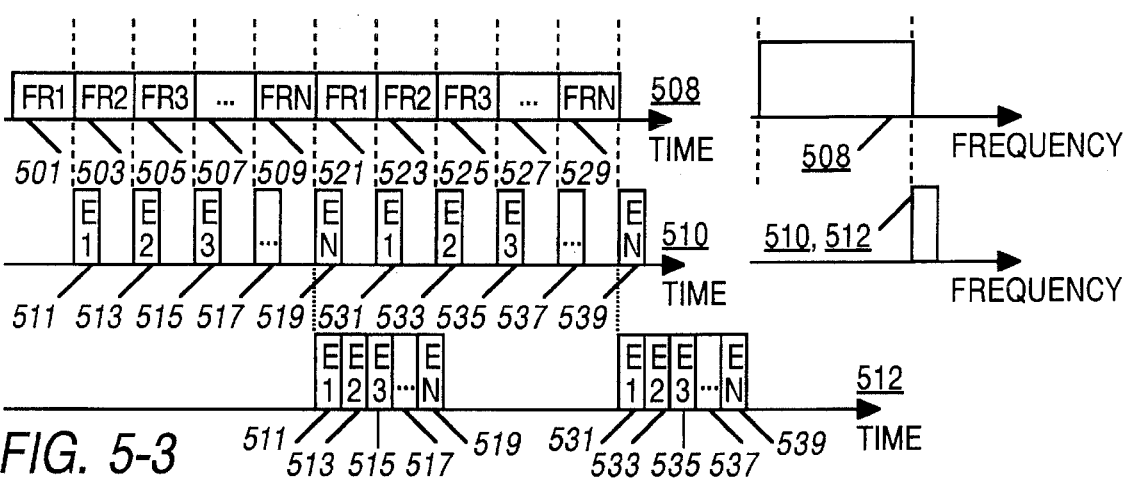

A flowchart of transmitting device activity is shown in FIG. 3. Generally, the flow chart of FIG. 3 is embodied in a microprocessor located in the communication units 103, 105, 107, and 109 and/or other transmitting devices, such as base stations 101. A data message comprised of N frames is transmitted at step 301. At step 303, the transmitting device looks for any received energy bursts in a predetermined time window. This window may be located in time immediately following transmission and reception of the data message or delayed some known amount of time after the data message is completely transmitted. Enough time must be allocated to allow communication units at the maximum receivable distance to receive the data message, determine if the message is of acceptable quality, ready the communication unit's transmitter to be set to transmit, and transmit the energy burst. The energy bursts may also be transmitted in a frequency band of the communication channel that is different from the frequency band in which the data message is transmitted. For example, a 500 Hz frequency band may be partitioned from an allocated communication channel for transmission of energy bursts. See FIG. 2-1, FIG. 2-2, FIG. 5-1, FIG. 5-2, FIG. 5-3, and FIG. 5-4 for additional details in the temporal and frequency location of energy bursts with respect to the data messages.

If at step 305 no energy burst is detected, the message is assumed to have been correctly received, and the process ends. If at step 305 one or more energy bursts are detected, then the transmitting device determines which frames were negatively acknowledged (NACKed) at step 307. Because there is a predetermined time and frequency correspondence between each energy burst and a data frame, this determination is simply a correspondence check. The NACKed data frames are retransmitted at step 309, and the process continues with step 303. The transmitting device continues to retransmit NACKed data frames as long as energy bursts are detected in the predetermined time window. The transmitting device may then begin transmission of a new data message. A transmitting device may also transmit many different messages before retransmitting a message, if it is so desired.

Figures 4, 5:
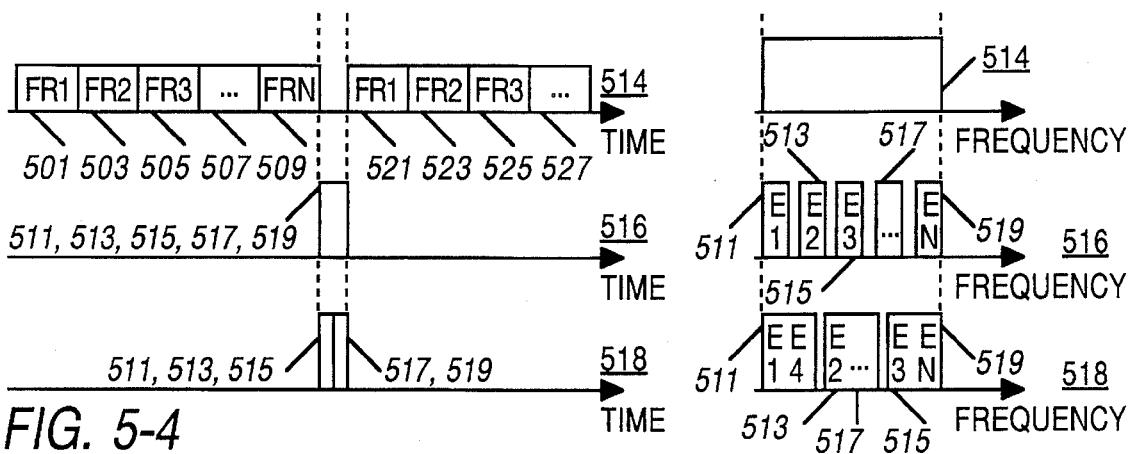

A flowchart of receiving device activity is shown in FIG. 4. Generally, the flow chart of FIG. 4 is embodied in a microprocessor located in the communication units 103, 105, 107, and 109 and/or any other receiving devices, such as base stations 101. At step 401, the receiving device receives the N frames of the data message transmitted by the transmitting device in step 301. The quality of each received frame of the data message is determined at step 403. Such determinations are well known in the art, and include cyclic redundancy checks, Hamming codes, and so forth. If at step 405 the quality of all of the data frames of the data message is acceptable, the process continues with step 407, where the data message is stored in the receiving device, and the process ends. If the quality of one or more of the received data frames is unacceptable at step 405, the process continues with step 407, where the data flames of acceptable quality are stored. At step 411, the receiving device transmits an energy burst for each data frame received with unacceptable quality. The energy burst is transmitted in a predetermined time window, such as shown in FIG. 2-1, FIG. 2-2, FIG. 5-1, FIG. 5-2, FIG. 5-3, and FIG. 5-4. The process continues with step 413, where the retransmitted data message frames are received from step 309, and the process continues with step 403.

The flowcharts of FIG. 3 and FIG. 4 reflect the situation where a data message is divided into flames. The same flowchart applies to a data message that is not divided into frames, such as those shown in FIG. 2-1 and FIG. 2-2, by looking at the unframed message as a framed message having only one frame.

Throughout FIG. 5-1, FIG. 5-2, and FIG. 5-3, the reference numerals 500, 504, 508, or 514 represent all data message frames 501, 503, 505, 507, 509, 521, 523, 525, 527, and 529, and the reference numerals 502, 506, 510, 512, 516, or 518 represent all energy bursts 511, 513, 515, 517, 519, 531, 533, 535, 537, and 539.

Timing diagrams and frequency diagrams of the transmission of data messages and energy bursts are shown in FIG. 5-1, where the data message is transmitted in multiple contiguous flames, and the corresponding energy bursts are transmitted in multiple time segments within a predetermined window of time. Long data messages are commonly divided into smaller sections, typically called frames. As shown in the timing diagrams on the left of FIG. 5-1, the data message is divided into N flames. When transmission of the N frames 501, 503, 505, 507, and 509 is completed, the time window for energy bursts is set substantially immediately after the Nth frame 509. In FIG. 5-1, the time window for the framed message is divided into N time segments, or slots, where each of the N segments corresponds to one of the N frames of the data message. Thus, a time segment is alloted for an energy burst for each of the N frames. One or more of the N energy bursts 511, 513, 515, 517, and 519 are transmitted when the corresponding frame is received with unacceptable quality. A typical data message frame duration is approximately 15 milliseconds, while a typical energy burst may be approximately 1 millisecond in length. Nevertheless, the energy bursts may be of any length as best suits a particular communication system. After the end of the time window, the transmitter may resume transmitting data message frames 521 and 523 that are part of a new data message or a retransmission of only the particular frame(s) of the first message that were not adequately received.

Timing diagrams and frequency diagrams of the transmission of data messages and energy bursts are shown in FIG. 5-2, where the data messages and energy bursts are transmitted in the same frequency band, and the time windows for transmitting energy bursts fall between the transmission of frames of a data message. The timing diagrams on the left of FIG. 5-2 show an alternative timing pattern to the one shown in FIG. 5-1. A first frame 501 is transmitted following by time slot for a first energy burst 511, a second frame 503 is transmitted followed by a time slot for a second energy burst 513, a third frame 505 is transmitted followed by a time slot for a third energy burst 515, and so forth. Time slots for the data message frames 504 are alternated with the time slots for the energy bursts 506 in this timing scheme. The frequency diagram at the right of FIG. 5-2 shows the message frames 504 and the energy bursts 506 occupying the same frequency band when they are transmitted.

Timing diagrams and frequency diagrams of the transmission of data messages, in frames, and energy bursts in different frequency bands are shown in FIG. 5-3. The frames 508 of the data messages are transmitting back-to-back, i.e., with no time in between, if it is so desired, hence the last frame 509 of a first data message may be followed immediately by the first frame 521 of a second data message. The corresponding energy bursts 510 for each of the frames are transmitted substantially immediately after the frame transmission is completed. For example, the energy burst 511 for the first frame 501 is transmitted substantially immediately after the first frame 501, i.e., during the beginning of the second frame 503. The time segment for the first energy burst 511 may completely fill the time segment allowed for transmission of the second frame 503. Similarly, the energy burst 513 for the second frame 503 may completely fill the time allowed for transmission of the third frame 505. Alternatively, as is seen in the lowest timing diagram, all the energy bursts 512 may be transmitted in sequence following transmission of the Nth frame of the data. Similarly, energy bursts may be sent singly, coupled in pairs or any combination thereof, as long as the transmitting device knows when and where to look for the energy burst in frequency and time.

The energy bursts 510 and 512 may be transmitted in one or more frequency bands, either within the same communication channel (as shown) or in a different frequency channel (not shown) than the one in which the data message frames 508 are transmitted. As is shown in the frequency diagram on the right of FIG. 5-3, each of the energy bursts is transmitted simultaneously as data is received, but in a different frequency band. The frequency bands for transmitting the energy bursts may be located at the end of the frequency channel (as shown), at the beginning of the channel (not shown), or in the middle of the channel (not shown).

Timing diagrams and frequency diagrams of the transmission of data messages and energy bursts in separate time windows are shown in FIG. 5-4, where the data message is transmitted in multiple contiguous frames, and where the energy bursts are transmitted simultaneously in multiple frequency bands. The timing diagrams on the left of FIG. 5-4 show windows for energy bursts 516 and 518 that are transmitted simultaneously in the same time window. No data frames are transmitted during this time window.

The center frequency diagram on the right of FIG. 5-4 shows that the frequency band in which the data frames 514 are transmitted is divided into N frequency band divisions for energy burst 516 transmission. Each of the N frequency band divisions corresponds to one of the N frames of the data message. An energy burst 516 is simultaneously transmitted in the corresponding one of the N frequency bands for each frame of data that is received with unacceptable quality. At the end of the time window, the transmitter may resume transmitting data message frames 521, 523, 525, and 527, which may be part of a new data message or a retransmission of the particular frame(s) of the first message for which energy bursts were detected.

The lowest timing diagram on the left of FIG. 5-4 shows M energy bursts transmitted simultaneously in each of N+M contiguous time segments, in this case there are two time segments, where M is three, and N is six. The time window is divided into multiple segments, which are shown as being narrow segments, but the duration of the window, and consequently the duration of the time segments, may be increased as necessary.

The lowest frequency diagram on the right of FIG. 5-4 shows that the frequency band in which the data flames 514 are transmitted is divided into M frequency band divisions for energy burst 518 transmission, where M is three in this example. Each energy burst 518 has both a time location and frequency location, from multiple time locations and multiple frequency locations. Thus, each combination of a single time segment and a frequency band division corresponds to one of the N frames of the data message.

In the example illustrated in FIG. 5-4, the data message flames and the energy bursts are transmitted in substantially the same frequency band. It should be clear to one of ordinary skill in the art that the principles related to use of different frequency bands for the data message and the energy burst transmissions, as illustrated in FIG. 5-3 or FIG. 2-2, may be applied with equal benefit to this case.

Thus, the present invention provides for negative acknowledgement of data messages by the data message receivers that transmit energy bursts, which indicate that part or all of a data message has been received with unacceptably quality. The energy bursts contain no message or specific data. Hence, if multiple communication units transmit an energy burst simultaneously, they will reinforce any other bursts, rather than corrupt or negate a previous energy burst. Because the energy burst is transmitted in a known temporal and spectral location, there is no need to append a particular message number, because the temporal and spectral location of the energy burst identifies the message or message portion. Only a NACK, in the form of an energy burst, is transmitted, hence silence is assumed to be an ACK from all units. Thus, the present invention efficiently uses frequency resources with little waste.

What is claimed is:

1. A method comprising the steps of:

transmitting a first data message to a plurality of communication units in a first time window and in a first frequency window;

receiving the first data message by the plurality of communication units;

determining, by each of the plurality of communication units, whether the quality of the received first data message is acceptable;

transmitting a second data message in a second time window and in the first frequency window, wherein the first time window and the second time window are different time windows;

when at least one of the plurality of communication units determines that the received data message is of unacceptable quality, transmitting, by the at least one of the plurality of communication units, an energy burst in a predetermined time window and a second frequency window, wherein the first frequency window and the second frequency window are different frequency windows, and wherein the predetermined time window falls within the second time window.

2. The method of claim 1, further comprising the step of retransmitting the data message to the plurality of communication units upon detection of the energy burst.

3. The method of claim 1, wherein the predetermined time window is temporally located immediately subsequent to the receipt of the data message.

4. The method of claim 1, wherein the energy burst is a radio frequency energy burst that is transmitted in a predetermined radio frequency band.

5. The method of claim 4, wherein the data message is transmitted in a radio frequency band other than the frequency band in which the energy burst is transmitted.

6. The method of claim 5, wherein a second data message is transmitted immediately subsequent to the transmission of the data message.

7. A method comprising the steps of:
transmitting a data message comprised of a multiplicity of data frames to a plurality of communication units;
receiving the data message by the plurality of communication units;
determining, by each of the plurality of communication units, whether the quality of each frame of the received data message is acceptable;
when at least one of the plurality of communication units determines that at least two frames of the received data message are of unacceptable quality, transmitting, by the at least one of the plurality of communication units, an energy burst in a predetermined time window and in, multiplicity of frequency band divisions. wherein each of the multiplicity of data frames corresponds to one of the multiplicity of frequency band divisions and wherein at least two of the energy burst transmissions are simultaneous.

8. The method of claim 7, wherein the predetermined time window is temporally located immediately subsequent to the receipt of the data message.

9. The method of claim 7, wherein the predetermined time window is comprised of a multiplicity of time segments.

10. The method of claim 9, wherein each frame of the data message corresponds to one of the multiplicity of time segments; and when at least one of the plurality of communication units determines that at least two frames of the received data message are of unacceptable quality, transmitting, by the at least one of the plurality of communication units, an energy burst in at least one of the multiplicity of time segments.

11. The method of claim 7, further comprising the step of retransmitting the at least two frames of the received data message to the plurality of communication units after detection of the energy burst.

12. The method of claim 7, wherein all energy burst transmissions are simultaneous.

13. The method of claim 7, wherein the number of frequency band divisions is the same number as the number of data frames.

14. The method of claim 7, wherein the predetermined time window is comprised of a multiplicity of time segments and wherein each combination of a single time segment and a frequency band division corresponds to one of the multiplicity of flames of the data message.

15. The method of claim 7, wherein each of the multiplicity of data flames corresponds to a time-frequency pair, wherein each time frequency pair corresponds to one of the multiplicity of time segments and one of the multiplicity of frequency band divisions; and when at least one of the plurality of communication units determines that at least two frames of the received data message is of unacceptable quality, transmitting, by the at least one of the plurality of communication units, an energy burst in at least one of the time-frequency pairs corresponding to the at least one frame of the received data message.

16. The method of claim 7, wherein the data message is transmitted in a radio frequency band other than the frequency band in which the energy burst is transmitted.

17. The method of claim 7, wherein a second data message is transmitted immediately subsequent to the transmission of the data message.

18. A communication unit comprising:
a receiver for receiving a data message transmitted in multiple frames;
a determiner, operatively coupled to the receiver, for determining whether the quality of each of the multiple flames of the received data message is acceptable; and
a transmitter, operatively coupled to the determiner, for simultaneously transmitting in a predetermined time window an energy burst in a different frequency window for each different frame that is of unacceptable quality when it is determined that two or more frames of the received data message is of unacceptable quality.

19. The communication unit of claim 18, wherein the predetermined time window is temporally located immediately subsequent to the receipt of the data message.

20. The communication unit of claim 18, wherein the energy burst is a radio frequency energy burst.

21. The communication unit of claim 18, wherein the data message is transmitted in a radio frequency band other than the frequency band in which the energy burst is transmitted.

* * * * *

UNITED STATES PATENT AND TRADEMARK OFFICE
CERTIFICATE OF CORRECTION

PATENT NO. : 5,517,507
DATED : May 14, 1996
INVENTOR(S) : Michael L. Needham, Kenneth J. Crisler, Lawrence J. Marturano, and Mark A. Gannon It is certified that error appears in the above-indentified patent and that said Letters Patent is hereby corrected as shown below:

```
Co. 10, line 8, "flames" should be --frames--,
        line 10, "flames" should be --frames--, and at
        line 33, "flames" should be --frames--.
```

Signed and Sealed this

Sixth Day of August, 1996

BRUCE LEHMAN

*Attest:*

*Attesting Officer*     Commissioner of Patents and Trademarks